United States Patent Office 3,501,458
Patented Mar. 17, 1970

3,501,458
PREPARATION OF N,N-DIALKYL-1-
AZIRIDINECARBOXAMIDES
Donald A. Tomalia and Janet N. Paige, Midland, Mich.,
assignors to The Dow Chemical Company, Midland,
Mich., a corporation of Delaware
No Drawing. Filed Feb. 6, 1967, Ser. No. 614,041
Int. Cl. C07d 23/06
U.S. Cl. 260—239      8 Claims

ABSTRACT OF THE DISCLOSURE

N,N-dialkyl-1-aziridinecarboxamides are prepared by contacting a trialkylamine with phosgene and then contacting the intermediate product thus formed with an aziridine. The process is desirably carried out in an inert solvent at a temperature of from $-10°$ to $100°$ C.

FIELD OF THE INVENTION

This invention relates to a novel process for preparing N,N-dialkyl-1-aziridinecarboxamides. More particularly, it relates to a process for preparing N,N-dialkyl-1-aziridinecarboxamides from a trialkylamine, phosgene, and an aziridine. The process may be carried out smoothly and without elaborate equipment.

DESCRIPTION OF THE PRIOR ART

H. Bestian, Ann. 566, 210(1950) discloses the preparation of N,N-dialkyl-1-aziridinecarboxamides by reacting an aziridine with carbamoyl chloride in the presence of an acid acceptor, such as triethylamine. The preparation of N,N-dialkyl-1-aziridinecarboxamides by this route involves a two-step process starting from phosgene and a secondary amine. The carbamoyl chlorides are generally prepared by the reaction of a secondary amine with phosgene in the presence of an acid acceptor. This preparation often requires elaborate equipment and reaction temperatures of from 100° to 275° C. See R. J. Slocombe et al., JACS 72, 1889(1950). The resulting N,N-disubstituted carbamoyl chlorides are then reacted with the aziridine at temperatures below $-10°$ C. in the presence of triethylamine as an acid acceptor to give N,N-dialkyl-1-aziridinecarboxamides, as disclosed by Bestian.

SUMMARY OF THE INVENTION

It has now been discovered that N,N-dialkyl-1-aziridinecarboxamides may easily be prepared from a trialkylamine, phosgene, and an aziridine. The compounds which may be prepared according to this invention have the formula:

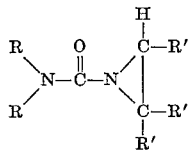

wherein R is, independently in each case, an alkyl group of from 1 to 4 carbon atoms, and R' is, independently in each case, hydrogen, an alkyl group of from 1 to 4 carbon atoms, or an aryl group of from 6 to 12 carbon atoms. They are prepared by contacting a trialkylamine (wherein the alkyl groups have from 1 to 4 carbon atoms) and phosgene to form an intermediate trialyklamine-phosgene complex. The complex is then contacted with an aziridine having the formula:

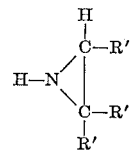

wherein R' is as described previously, to form the resulting N,N-dialkyl-1-aziridinecarboxamide. The process is preferably carried out in the presence of an inert solvent (a solvent with which the trialkyl amine, the phosgene, the resulting trialkylamine-phosgene complex, the aziridine, and the N,N-dialkyl-1-aziridinecarboxamide are non-reactive under the reaction conditions employed herein) at a temperature of from about $-10°$ to about $100°$ C.

DETAILED DESCRIPTION OF THE INVENTION

2:1 (molar ratio) trialkylamine-phosgene complex is prepared in situ by the reaction between the trialkylamine and phosgene (desirably combined in the ratio of from 1 to 3 moles of the trialkylamine to 1 mole of phosgene) in an inert solvent at a temperature of from about $-10°$ to about $100°$ C. To the trialklamine-phosgene complex is then added the aziridine (desirably in a ratio of 0.5 to 3 moles of aziridine to one mole of the triaylklamine-phosgene complex) within the same temperature range. Trialkylamine hydrochloride precipitates and a mole of RCl is produced as a byproduct. After filtering off the trialkylamine salt, the aziridine is obtained from the filtrate, usually in a yield of about 50–60 percent of theory.

Suitable specific examples of trialkylamines for use in the process of this invention include:

trimethylamine,
triethylamine,
tripropylamine,
tributylamine,
N,N-dimethylethylamine,
N-methyldiethylamine,
N,N-dimethylpropylamine,
N-ethyldipropylamine,
N-methyldipropylamine,
N,N-dimethylbutylamine,
N,N-diethylbutylamine,
N-methyldibutylamine,
N-ethyldibutylamine,
N-propyldibutylamine,
N-methyl-N-ethylpropylamine,
N-ethyl-N-methylpropylamine,
N-ethyl-N-propylbutylamine, and the like. The preferred trialkylamines for the practice of this invention are trimethylamine and triethylamine.

Suitable specific examples of aziridines for reaction with the trialkylamine-phosgene complex include aziridine,
2-methylaziridine,
2,3-dimethylaziridine,
2,2-dimethylaziridine,
2,2,3-trimethylaziridine,
2-ethylaziridine,
2,2-diethylaziridine,
2,2,3-triethylaziridine,
2,2-dimethyl-3-ethylaziridine, 2-(n-propyl)-aziridine,
2-(sec-butyl)aziridine,
2-phenylaziridine,
2-methyl-3-phenylaziridine, and the like. The preferred aziridines for use in the present process are aziridine, 2-methylaziridine, and 2-phenylaziridine.

Best yields of the desired N,N-dialkyl-1-aziridinecarboxamides are obtained when the process is carried out at a temperature of between −10° and 100° C. At higher or lower temperatures yields are substantially decreased.

The process of this invention is desirably carried out in an inert, non-polar reaction solvent. Suitable specific examples of such solvents include chlorinated aliphatic hydrocarbon solvents, such as 1,1,1-trichloroethane, carbon tetrachloride, chloroform, methylene chloride, methylene bromide, ethylene chloride, ethylene bromide, perchloroethylene, and chlorinated aromatic hydrocarbons, such as mono- and poly-chlorobenzene, and the like; aromatic hydrocarbon solvents, such as benzene, xylene, toluene, and the like; aliphatic hydrocarbon solvents containing from 5 to 10 carbon atoms, such as n-pentane, n-heptane, iso-octane, n-decane, and the like; cycloaliphatic hydrocarbon solvents, such as cyclohexane, 2-methylcyclohexane, 2-ethylcyclohexane, and the like; ethers, such as diethyl ether, dimethyl and diethyl ethers of ethylene glycol or diethylene glycol, mixtures of the above solvents, and the like.

In practice, the process of this invention is desirably carried out by adding the trialkylamine slowly to a solution of phosgene in an inert solvent, at a solution temperature of from about −10° C. to room temperature (20–25° C.). This is followed by the slow addition of a solution of the aziridine suitably in an inert solvent under the same conditions. The reaction mixture may then be stirred for several hours within the same temperature range and filtered to remove the trialkylamine salt. Removal of the inert solvent and the byproduct RCl from the filtrate by conventional means, such as distillation, gives the desired products, usually as light yellow oils.

The N,N-dialkyl-1-aziridine carboxamides are biologically active and can be isomerized to yield oxazolines according to the method disclosed by Heine et al., JACS, 83, 2570 (1961).

DESCRIPTION OF THE PREFERRED EMBODIMENTS

The following non-limiting examples are preferred embodiments and describe the invention further.

EXAMPLE 1

Phosgene (49.0 g., 0.5 mole) was condensed into a 2 liter, 3-necked flask containing 700 ml. of carbon tetrachloride and equipped with a stirrer, condenser, and addition funnel. While stirring at −10° to 0° C., a solution of triethylamine (101.0 g., 1.0 mole) in 150 ml. of carbon tetrachloride under the same conditions. The reaction mixture was stirred for 2 hours while maintaining a temperature within the above range and then filtered. After removing solvents and other volatile material from the filtrate, 40.7 g. of a light yellow oil was obtained, which represents a yield of 58 percent of theory. Distillation of this oil gave a colorless product, B.P. 42–44° C./2 mm. This product was identified as N,N-diethyl-1-aziridine carboxamide by its infrared spectrogram, which was identical to that of an authentic sample of N,N-diethyl-1-aziridinecarboxamide prepared according to the procedure of Bestian, Ann., 566, 210 (1950).

Trimethylamine is substituted in equivalent amounts in the above procedure to produce N,N-dimethyl-1-aziridinecarboxamide. Similarly, 2-methylaziridine and 2-phenylaziridine are substituted in equivalent amounts for the identical to that of an authentic sample of N,N-diethyl-1-(2-methyl)aziridinecarboxamide, and N,N-diethyl-1-(2-phenyl)aziridinecarboxamide, respectively.

EXAMPLE 2

The procedure of Example 1 was repeated except that only 21.5 g. (0.5 mole) of aziridine was used. This provided a ratio of 1 mole of aziridine to one mole of triethylamine-phosgene complex. A somewhat smaller amount of N,N-diethyl-1-aziridinecarboxamide than in the previous example was obtained.

What is claimed is:
1. A process for preparing compounds having the formula:

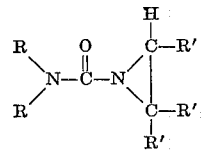

wherein R is, independently in each case, an alkyl group of from 1 to 4 carbon atoms, R' is, independently in each case, hydrogen, an alkyl group of from 1 to 4 carbon atoms, or an aryl group of from 6 to 12 carbon atoms, which comprises:
   (1) contacting a trialkylamine, the alkyl groups of which independently contain from 1 to 4 carbon atoms, and phosgene to form a trialkylamine-phosgene complex, and
   (2) contacting said complex with an aziridine having the formula:

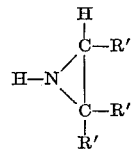

wherein R' is as defined previously, to form the resulting N,N-dialkyl-1-aziridinecarboxamide.

2. The process of claim 1 carried out in the presence of an inert solvent at a temperature of from about −10° to about 100° C.

3. The process of claim 2 wherein the trialkylamine is trimethylamine or triethylamine.

4. The process of claim 2 wherein the aziridine is aziridine, 2-methylaziridine, or 2-phenylaziridine.

5. The process of claim 2 wherein the aziridine is aziridine and the trialkylamine is triethylamine.

6. The process of claim 1 wherein the trialkylamine is trimethylamine or triethylamine.

7. The process of claim 1 wherein the aziridine is aziridine, 2-methylaziridine, or 2-phenylaziridine.

8. The process of claim 1 wherein the aziridine is aziridine and the trialkylamine is triethylamine.

References Cited

Bestian, Ann. der Chem., vol. 566, pp. 210–244 (1950).

ALTON D. ROLLINS, Primary Examiner

U.S. Cl. X.R.

260—307.6

PO-1050
(5/69)

UNITED STATES PATENT OFFICE
CERTIFICATE OF CORRECTION

Patent No. 3,501,458      Dated March 17, 1970

Inventor(s) Donald A. Tomalia et al

It is certified that error appears in the above-identified patent and that said Letters Patent are hereby corrected as shown below:

In Col. 3, line 57, after "tetrachloride" insert --was added drop-wise over a period of from one to two hours, followed by the drop-wise addition of a solution of aziridine (43.0 g, 1.0 mole) in 150 ml of carbon tetrachloride--. In Col. 4, line 5, delete "identical to that of an authentic sample of", and insert in its place --aziridine in the above procedure to yield--; line 27 after "atoms," insert --and--.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents